United States Patent
Takeyama et al.

(10) Patent No.: US 7,583,281 B2
(45) Date of Patent: Sep. 1, 2009

(54) IMAGE FORMING APPARATUS

(75) Inventors: Yoshinobu Takeyama, Kanagawa (JP);
Nobuyuki Yanagawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 710 days.

(21) Appl. No.: 11/183,749

(22) Filed: Jul. 19, 2005

(65) Prior Publication Data

US 2005/0264639 A1     Dec. 1, 2005

Related U.S. Application Data

(63) Continuation of application No. 10/870,958, filed on Jun. 21, 2004, now Pat. No. 6,919,911.

(30) Foreign Application Priority Data

Jul. 14, 2003    (JP)     ............................. 2003-196266

(51) Int. Cl.
*G03G 15/01* (2006.01)
*B41J 2/447* (2006.01)

(52) U.S. Cl. ...................... 347/234; 347/116
(58) Field of Classification Search ................. 347/116, 347/234; 399/301, 302
See application file for complete search history.

(56) References Cited

U.S. PATENT DOCUMENTS 6,108,501 A * 8/2000 Nagai .......................... 399/116

6,919,911 B2 * 7/2005 Takeyama et al. ............ 347/116
2003/0169325 A1   9/2003 Takeyama et al.

FOREIGN PATENT DOCUMENTS

JP     10-104537     4/1998
JP     2002-072607     3/2002

* cited by examiner

*Primary Examiner*—Huan H Tran
(74) *Attorney, Agent, or Firm*—Oblon, Spivak, McClelland, Maier & Neustadt, P.C.

(57) ABSTRACT

An image forming apparatus capable of decreasing the image unevenness of a superimposed image at the time of forming starting (head) lines of the images in respective colors with different beams in order to decrease a shift of a superimposed image. Let a position, where an image in a first color is formed with a beam A as a leading beam, be (a). Let a starting position of formation of an image in a second color be (b), and one dot (line) of shift arises in the superimposed image. In order to decrease the shift of the superimposed image, image formation is performed with selecting a beam B as a beam which writes a head of the image (c). When image formation is performed for color shift reduction with changing a leading beam for each color image, tonality correction is performed to each beam for subsequent images so as to decrease image unevenness due to the difference between shapes and exposure power of respective beams.

30 Claims, 7 Drawing Sheets

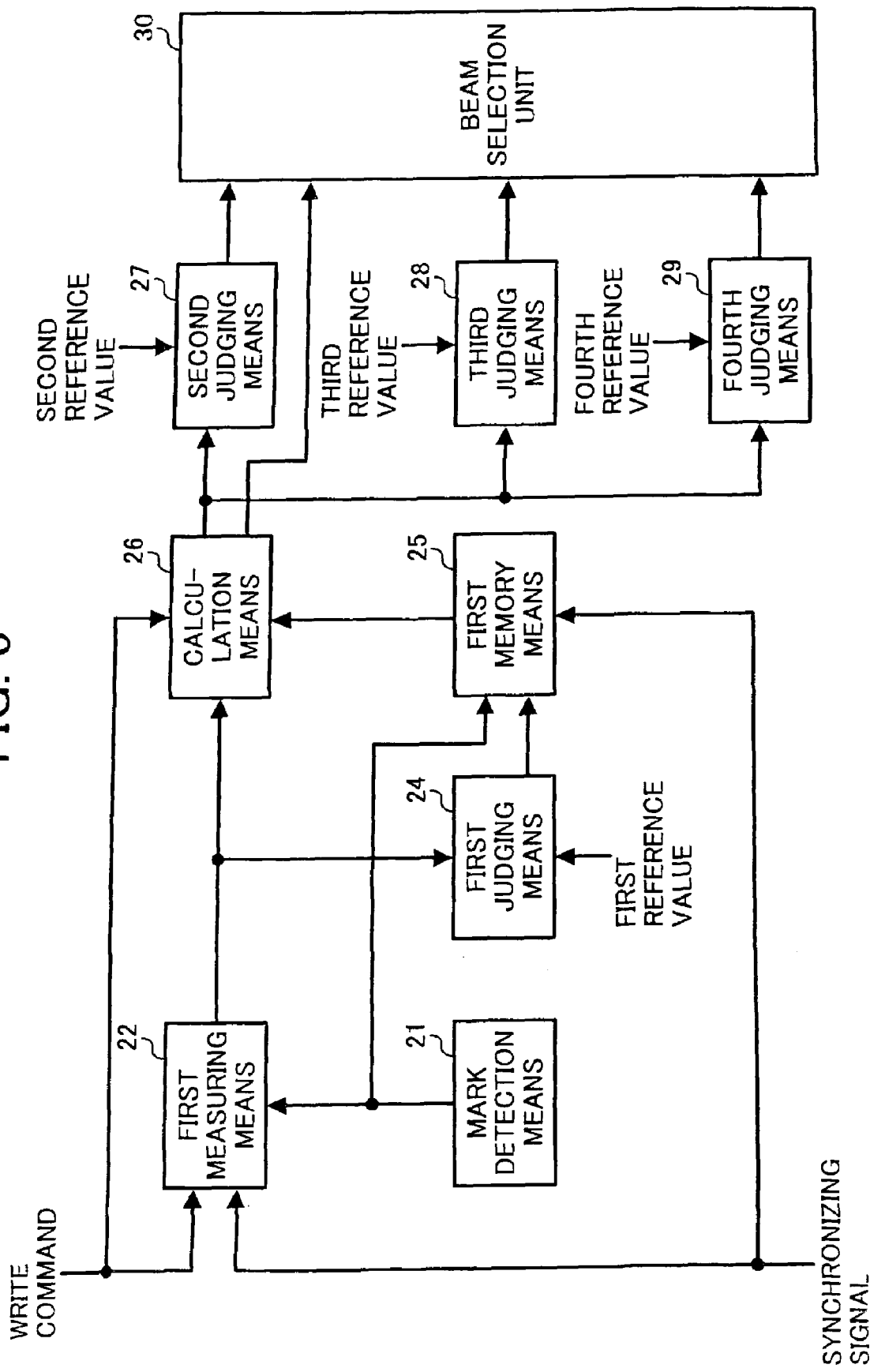

FIG. 7

| SECOND JUDGMENT | LARGE | SMALL | SMALL | SMALL | SMALL |
|---|---|---|---|---|---|
| THIRD JUDGMENT | – | LARGE | SMALL | SMALL | SMALL |
| FOURTH JUDGMENT | – | – | LARGE | LARGE | SMALL |
| SIGN OF DIFFERENTIAL | – | – | POSITIVE | NEGATIVE | – |
| DELAY OF SCAN | YES | YES | NO | NO | – |
| LEADING BEAM | B | A | B | A | A |
| CHANGE OF HEADLINE DATA | – | – | – | YES | – |

IMAGE FORMING APPARATUS

CROSS-REFERENCE TO RELATED APPLICATIONS

This application is a continuation of U.S. application Ser. No. 10/870,958, filed Jun. 21, 2004, which is based upon and claims the benefit of priority from the prior Japanese Patent Application No. 2003-196266, filed on Jul. 14, 2003, the entire contents of each of which are incorporated herein by reference.

BACKGROUND OF THE INVENTION

1. Field of the Invention

The present invention relates to an image forming apparatus, which uses a plurality of beams, such as a copier, a facsimile machine, and a printer, and in particular, to a method of improving the image quality of an image formed by the image forming apparatus.

2. Description of the Background Art

Conventionally, many image forming apparatuses of this type which scan with a plurality of beams concurrently and select a leading beam from among the plurality of beams such that color shifts may be prevented are disclosed in, for example, Japanese Patent Laid-Open No. 10-104537 and Japanese Patent Laid-Open No. 2002-072607. In this prior art, when image formation is performed by using a plurality of beams, writing is started from a headline of the image in each color with a different beam so as to decrease shifts between superimposed images. Nevertheless, when the writing of the beginning line of an image, i.e., a top line is started with different beams, there is a possibility that image unevenness arises in a superimposed image.

SUMMARY OF THE INVENTION

It is an object of the present invention to provide an image forming apparatus capable of decreasing the image unevenness of superimposed images when forming the beginning (head) lines of images in respective colors with beams which are different in order to decrease a shift of a superimposed image.

In accordance with the present invention, there is provided an image forming apparatus which generates a toner image from a latent image, formed on an image carrier by scan type writing means, by developing means, repeats multiple times steps of transferring the toner image on an intermediate transfer member for respective colors, and forms a color image with superimposing the toner images by turns for respective colors. The writing means to form the latent image is constituted such that a plurality of beams which is adjacent in a subscanning direction may perform concurrent scans, and can select from the plurality of beams a beam which becomes a head at the time of formation of an image in each color to perform tonality correction of each beam according to the selected beam.

BRIEF DESCRIPTION OF THE DRAWINGS

The above and other objects, features and advantages of the present invention will become more apparent from the following detailed description taken with the accompanying drawings in which:

FIG. 5 is a block diagram showing an example of the construction of beam selection control means;

FIG. 7 is a view for explaining the operation of beam selection;

DESCRIPTION OF THE PREFERRED EMBODIMENT

Hereafter, the present invention will be described specifically with reference to accompanying drawings.

Figure 1:
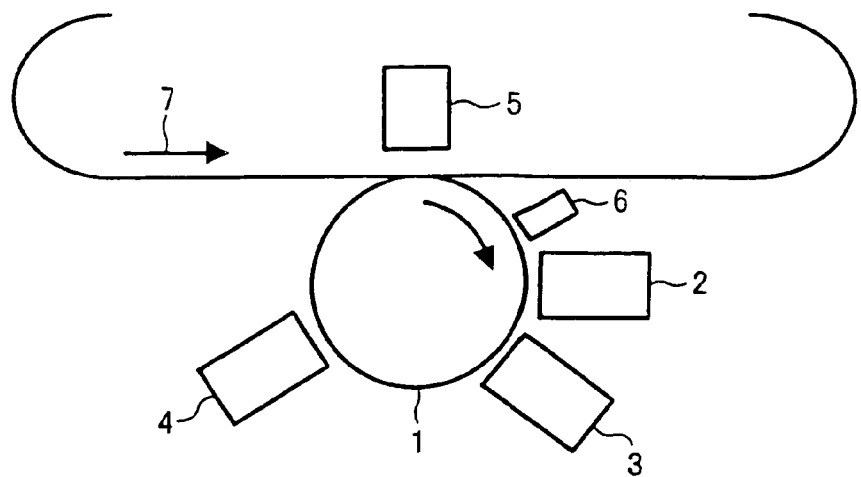
FIG. 1 is a diagram showing an example of the basic construction of an image forming apparatus according to the present invention.

FIG. 1 shows an example of the basic construction of an image forming apparatus according to the present invention. The image forming apparatus forms a color image by generating a toner image by developing means from a latent image formed on an image carrier by scan type writing means, repeating multiple times a step of transferring the toner image on an intermediate transfer member for every color, and superimposing the toner image by turns for every color.

As shown in FIG. 1, charging means 2, writing means 3, developing means 4, transfer means 5, and cleaning means 6 are located around an image carrier 1 such as a photoconductive drum. In addition, an intermediate transfer member 7 such as an endless belt is located above the image carrier 1. Furthermore, the intermediate transfer member 7 is provided with a mark indicating a reference position.

In operation, a surface of the image carrier 1 which rotates in the direction shown by an arrow is charged by the charging means 2. When the mark on the intermediate transfer member 7 is detected, the writing means 3 starts forming a latent image on the image carrier 1. The latent image on the image carrier is transformed into a visualized image by the developing means 4 as a toner image, and the toner image is transferred to the intermediate transfer member 7 by the transfer means 5. The residual toner on the image carrier 1 after transfer is removed by the cleaning means 6.

When a color image is formed, the above-mentioned developing steps are repeated by the number of times of necessary colors by switching the developing means 4 with switching means not shown and the image in each color is superimposed on the intermediate transfer member 7.

The image superimposed on the intermediate transfer member 7 is transferred to a recording medium such as transfer sheet by another transfer means not shown, and is fixed thereto by fixing means not shown.

The image formation on each color is started on the basis of the mark on the intermediate transfer member 7. When the writing means 3 is a laser scanning optical system, the mark detection in the intermediate transfer member 7 and a synchronizing signal as a writing reference of the writing means 3 are asynchronous. Hence, even if the image formation is started on the basis of the mark of the intermediate transfer member 7, a shift occurs between the superimposed images in respective colors.

An image forming apparatus provided with writing means, which uses a plurality of light sources and performs simultaneous scans with a plurality of beams adjoining in a subscanning direction, decreases the shift of the superimposed images by selecting a beam which forms an image head line.

Hereinafter, an example of an apparatus will be described with reference to the drawings. The apparatus performs simultaneous scans of two lines of beams A and B in one scan with the writing means to form an image and superimposes images in respective colors on the basis of a reference signal such as a belt mark.

Figure 2A:
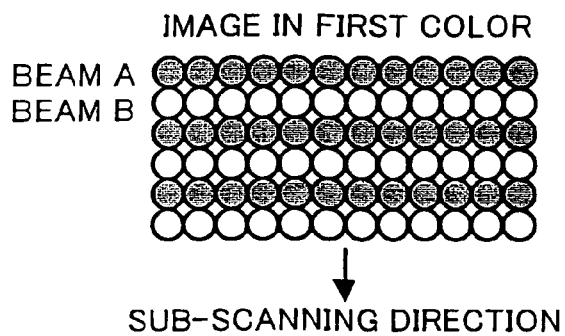
FIGS. 2A to 2C are views showing schematically lines (solid) formed by dots of beams A and B.
Figure 2B:
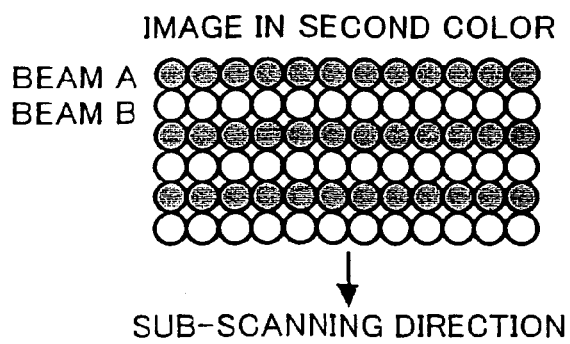
Figure 2C:
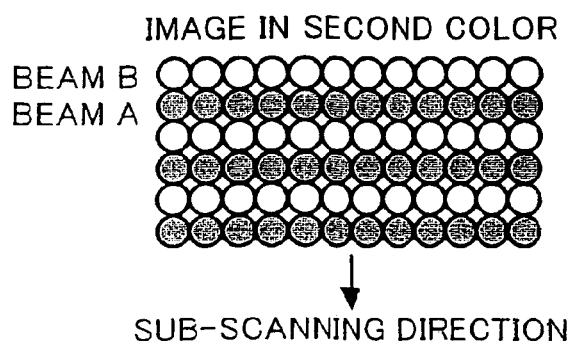

FIGS. 2A to 2C schematically show lines (solid) formed by dots of respective beams. Arrangement is made such that the beam A may precede the beam B in a subscanning direction when an image carrier is scanned. In this diagram, a dot line pair shown as the beam A and beam B is formed by a first scan, and dot line pairs of the beams A and B following the above-mentioned dot line pair therebelow are formed in order by second and later scans.

It is ideal to start to write all the images in respective colors from the same beam, for example, the beam A. However, there is a case that headlines of images may be written with different beams for reduction of the shift of a superimposed image.

It is assumed that a position where an image in a first color (first rotation) is formed with the beam A (black dot) as a leading beam is, for example, a position shown in FIG. 2A when performing the image formation with a first synchronizing signal to a mark signal. At this time, if a position where the formation of an image in a second color (second rotation) starts is one shown in FIG. 2B, a shift by one dot (line) occurs in a superimposed image. As shown in FIG. 2C, when image formation is performed by selecting the beam B as the beam as the head of an image, the shift of a superimposed image may be decreased. The beam selection is performed by sending empty data, i.e., dummy data to the beam A, and supplying to the beam B the data for the headline of the image.

That is, an even line and an odd line in the images in the first and second colors, are formed with different beams. Although there is no problem if dot shapes and exposure power of the beams A and B are completely the same, they are different actually.

It is noted that unevenness appears in a superimposed image of the images in the first and second colors. Then, when image formation is performed by changing a leading beam for each color image for color shift reduction, tonality correction is performed to each beam for subsequent images so as to decrease image unevenness due to the difference between shapes and power of respective beams.

Figure 3:
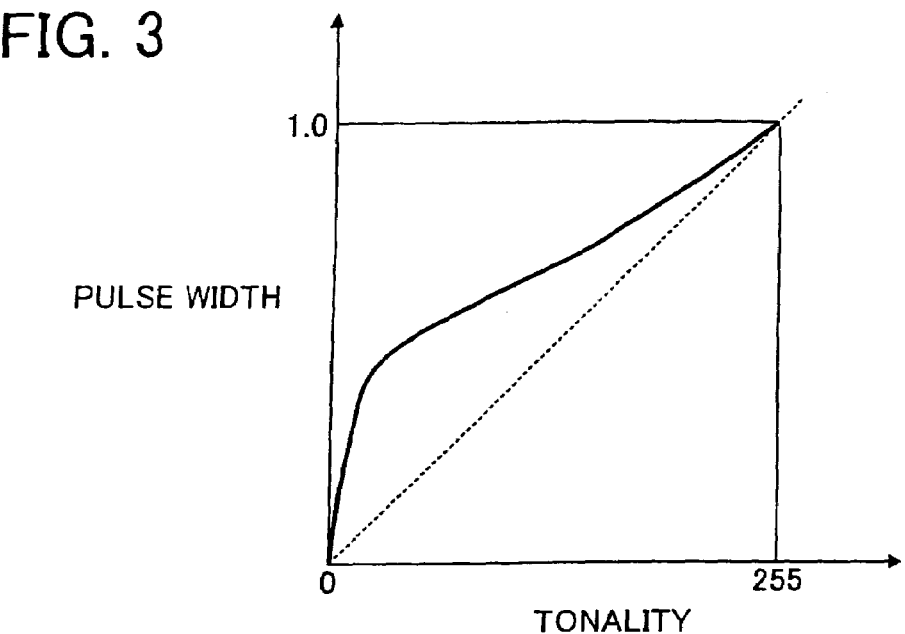
FIG. 3 is a graph showing an example of a γ curve.

The tonality correction is performed by modifying a γ curve or the emission power of a light source (LD) which generates a beam. For example, a modification may be made so that a portion of γ curve (represented as solid line in FIG. 3) at low tonality region can be compensated, in the case where beams are superimposed which have thinner shapes at shorter lighting times in pulse width modulation, where there is no change in the dot shape in full lighting (pulse width: 1.0) for one dot of beam. Alternatively, the difference in dot shapes may be reduced by presetting the emission power of beams higher to some extent.

The modification table of the γ curve and the corrective values for the emission power change, described above, are obtained beforehand by outputting superimposed images for beams. In addition, a change of image processing is also made depending on the case. When the leading beam of an image to be formed is the same as that of a preceding color image, the tonality correction mentioned above is not performed. Third and later colors are performed similarly.

Also when the number of beams scanning concurrently is three or more, correction is made for each of beams that form dots overlapping in the subsequent image formation, thereby reducing image unevenness in the case where the order of formation beams depends on the color.

A specific method of selecting a leading beam will be described.

Timing of scanning beams with respect to a belt mark signal, which is the starting reference of image formation in each color, represented as dot positions, is illustrated in FIGS. 4A to 4D. Hereinafter, the description is made while the generating timing of a synchronizing signal of the writing means is represented by the centers of dots.

Figure 4A:
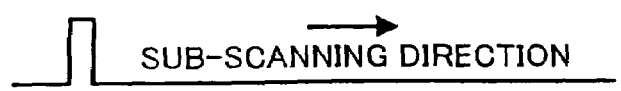
FIGS. 4A to 4D are views showing an example of the timing (dot positions) of scanning beams to a belt mark signal.
Figure 4B:
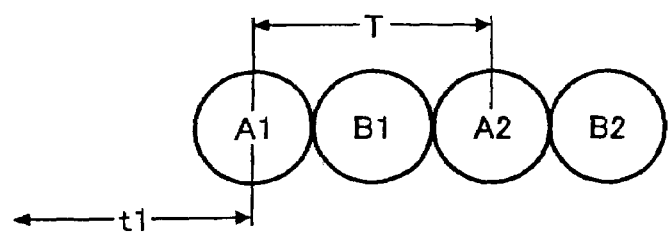

Here, FIG. 4A shows the belt mark signal. In addition, time T in FIG. 4B is a line period. In addition, reference character A1 denotes a dot position formed by the beam A in a first scan, B1 denotes a dot position formed by the beam B in a fist scan, A2 denotes a dot position formed by the beam A in a second scan, and B2 denotes a dot position formed by the beam B in a second scan.

Figure 4C:
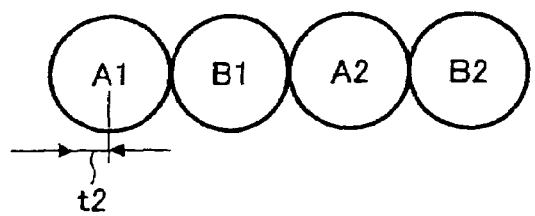

Suppose that the formation of an image in a first color is started in the timing t1 in FIG. 4B with respect to the belt mark. In the image formation in a second or later color, when t1−t2>3T/4 as shown in FIG. 4C, the image formation is started with one-scan delayed scanning. That is, a first line of image data is written from a position A2 shown in FIG. 4C. This allows the reduction of color shift between superimposed images. In this case, tonality correction is not performed since the beam at the image head is the same beam A as that in the first color.

Figure 4D:
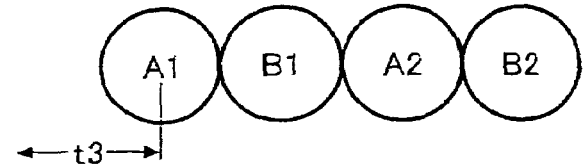

In addition, when T/4<t1−t3<3T/4 as shown in FIG. 4D, image data is written from a position B1. Here, a headline of the image is written with the beam B different from the beam A with which the headline of the image in the first color was formed. Therefore, the tonality correction is performed. Note that, in the case of t1−t3<T/4, image formation is started from the position A1 which is the same as that in the first color.

Here, if the image in the first color is formed in the timing in FIG. 4C, start timing in the second and later color as shown in FIG. 4B make it impossible to superimpose head lines. Then, image formation starts with a synchronized detection signal after a preset reference value, or T/2 in this case, has elapsed from the belt mark detection.

FIG. 5 shows the construction of beam selection control means which performs the control mentioned above. It comprises: mark detection means 21 for detecting a mark of the intermediate transfer member 7; first measuring means 22 for measuring elapsed time after mark detection whenever detecting the mark used as the reference of image formation start; first determining means 24 comparing a first reference value, set beforehand, with a measured value of the first measuring means 22 and judging their magnitude; first memory means 25 storing time (t1) from detecting the mark to a synchronizing signal when or after a measured value of the first measuring means 22 reached the first reference value; calculation means 26 obtaining a difference between measured time (t2, t3) in the first measuring means 22 from detecting the mark of the image starting reference in the second and later color to a synchronizing signal generated by the writing means, and the measurement result of the first memory means 25; and calculation means 26 outputting its absolute value and a positive or negative; second judging means 27 comparing the result of the calculation means 26 with a second reference value set beforehand and judging their magnitude; third judging means 28 comparing the result of the calculation means 26 with a third reference value set beforehand and judging their magnitude; fourth judging means 29 comparing the result of the calculation means 26 with a fourth reference value set beforehand and judging their magnitude; and beam selection unit 30 commanding beam selection to the writing controller from the result of the positive or negative of the difference, obtained by the calculation means 26, and the result of the second judging means 27, third judgment means 28, and fourth judging means 29.

Here, the first reference values is T/2 that is a half of a period T of the synchronizing signal of the writing means 3, the second reference value of the second judging means 27 is 5T/4, the third reference value of the third judging means 28 is 3T/4, and the fourth reference value of the fourth judging means 29 is T/4.

The control means in FIG. 5 will be described by using FIG. 6.

Figure 6:
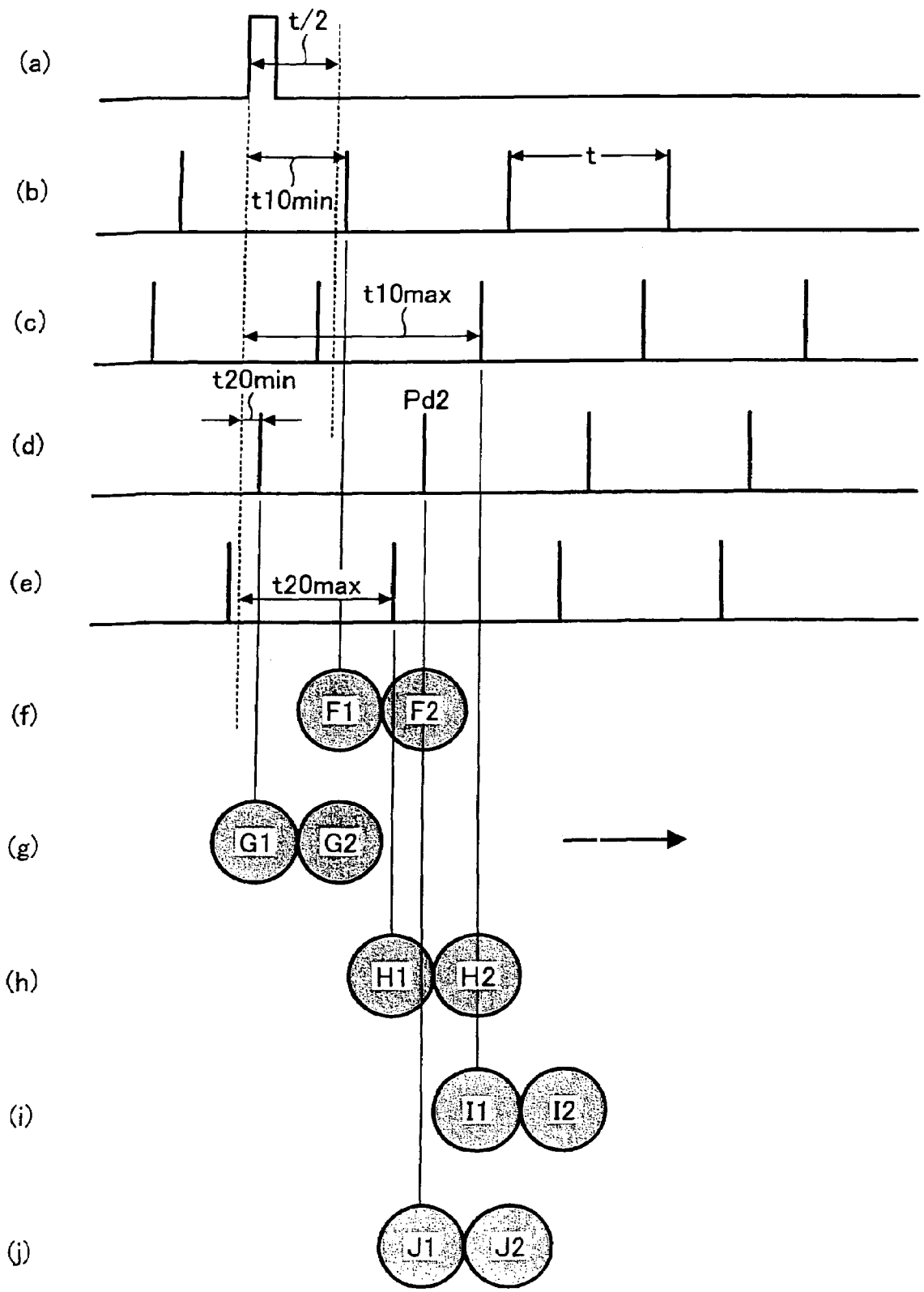
FIG. 6 is a view for describing the operation of the beam selection control means.

By the first determining means 24, the writing of a first color image is started with a synchronizing signal at the time when T/2 elapses after the detection of the mark signal shown by (a) in FIG. 6. Hence, the start timing of the image in the first color may occur between (b) and (c). Here, (b) is the case that a synchronizing signal occurs immediately after T/2 elapses, and (c) is the case that a synchronizing signal occurs just before T/2 elapses.

Since the writing means forms two lines in one scan, dot positions generated in respective timing are made as shown by (f) and (i) in FIG. 6. An arrow denotes a subscanning direction.

The first memory means 25 measures and stores a time period from the belt mark to the writing start with the synchronizing signal after the first reference value (T/2) elapses (for example, t10min or t10max). The start timing of images in second and later colors is changed in a period between (d) and (e) in FIG. 6 at the maximum similarly to the above.

The first measuring means 22 measures a time period from the detection of the mark to the generation of the synchronizing signal of the writing means 3 (for example, t20min or t20max). In addition, the calculation means 26 subtracts a time period until the generation of the synchronizing signal of the writing means 3 for second and later colors (for example, t20min or t20max) from a time period until the writing start of the image in the first color which the first memory means 25 measures and stores (for example, t10min or t10max), and obtains an absolute value and determines the sign such as positive or negative.

The second judging means 27 judges the magnitude between the result of the calculation means 26 and 5T/4 which is the second reference value, and outputs the result to the beam selection unit 30. The third judging means 28 judges the magnitude between the result of the calculation means 26 and 3T/4 which is the third reference value, and outputs the result to the beam selection unit 30. The fourth judging means 29 judges the magnitude between the result of the calculation means 26 and T/4 which is the fourth reference value, and outputs the result to the beam selection unit 30.

In addition, the calculation means 26 outputs the positive or negative sign of the difference to the beam selection unit 30. According to the result of each judging means and calculation means, the beam selection unit 30 selects a leading beam of images in the second and later colors as shown in FIG. 7, and controls the outputting order of image data in connection with it. Here, suppose that the beam A is used for the formation of a headline in the first color.

The operation of beam selection will be described with reference to FIG. 7. That is, if the result of the second judging means 27 is "larger", the beam selection unit 30 outputs head line data to a subsequent beam (beam B) that is in a scan operation delayed by one scan from the synchronizing signal immediately after the belt mark detection to start image formation. If the result of the second judging means 27 is "smaller" and the result of the third judging means 28 is "larger", the beam selection unit 30 starts image formation in a scan operation delayed by one scan from the synchronizing signal immediately after the belt mark detection. A leading beam at this time is the same as that in the first color.

If the result of the second judging means 27 and the result of the third judging means 28 are "smaller" and the result of the fourth judging means 29 is "larger", the beam selection unit 30 selects a beam according to the positive or negative of the difference obtained by the calculation means 26. If the difference is "positive", the beam selection unit 30 outputs head line data to a subsequent beam (beam B), and starts image formation. If the difference is "negative", the beam selection unit 30 outputs second line data to a leading beam (beam A), and starts the image formation.

When all the results of the second judging means 27, third judging means 28, and fourth judging means 29 are "smaller", the beam selection unit 30 starts the image formation from the same leading beam (beam A) as that in the first color.

A specific example is shown in FIG. 6. Suppose that the start of images in second and later colors is (d) or (e) when the formation of an image in the first color is started in the timing of (b) in FIG. 6, In the case of (d), since time difference Δt holds T/4<Δt<3T/4, the results of the second judging means and third judging means are "smaller", the result of the fourth judging means is "large", and Δt is "positive". Hence, the beam selection unit 30 writes headline data from a position of a consecutive beam B (dot G2).

In the case of (e), the result of each judging means is the same as the case of (d), but since Δt is "negative", image formation is performed from the second line data of an image in a position of the leading beam A (dot H1).

Owing to this, the head line data of the image data in the second and later colors can be written in a position G2 to the head line position (dot F1) in the first color, or the second line data in the second color can be written in a position H1 to a dot position F2 of the second line in the first color. Hence, it is possible to decrease a positional error.

In addition, when the first color starts in the timing (dot I1) of (c), the result of the second judging means 27 is "larger" when the start of images in second and later colors is in (d). Hence, the beam selection unit 30 starts writing with the consecutive beam B from a second synchronizing signal (delayed by one scan) after the mark detection. Also even when the number of scanning beams is three or more, similar control may be performed for reducing the position shift, by providing a plurality of reference values and judging means as mentioned above and setting conditions adequately.

Figure 8:
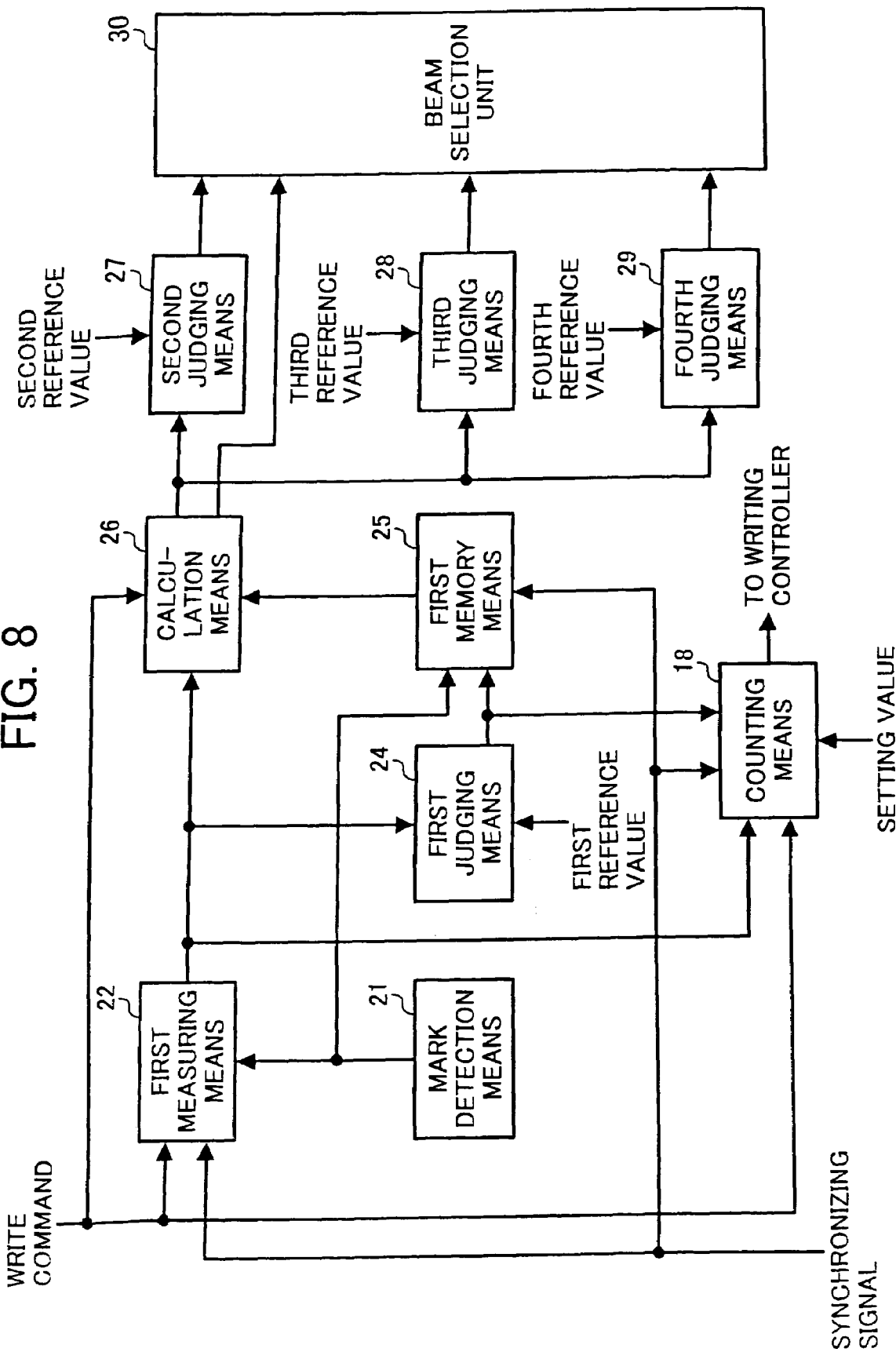
FIG. 8 is a block diagram showing another example of the construction of the beam selection control means.

In the previous description, although the formation of an image in the first color is started with a first synchronizing signal after the first reference value (here, T/2) elapses, there may be another examples. A setting value n is provided such that writing can be started with delaying a synchronizing signal of the writing means by n periods. FIG. 8 shows other construction of beam selection control means of the present invention. In this beam selection control means, counting means 18 is further added to the construction in FIG. 5.

Figure 9:
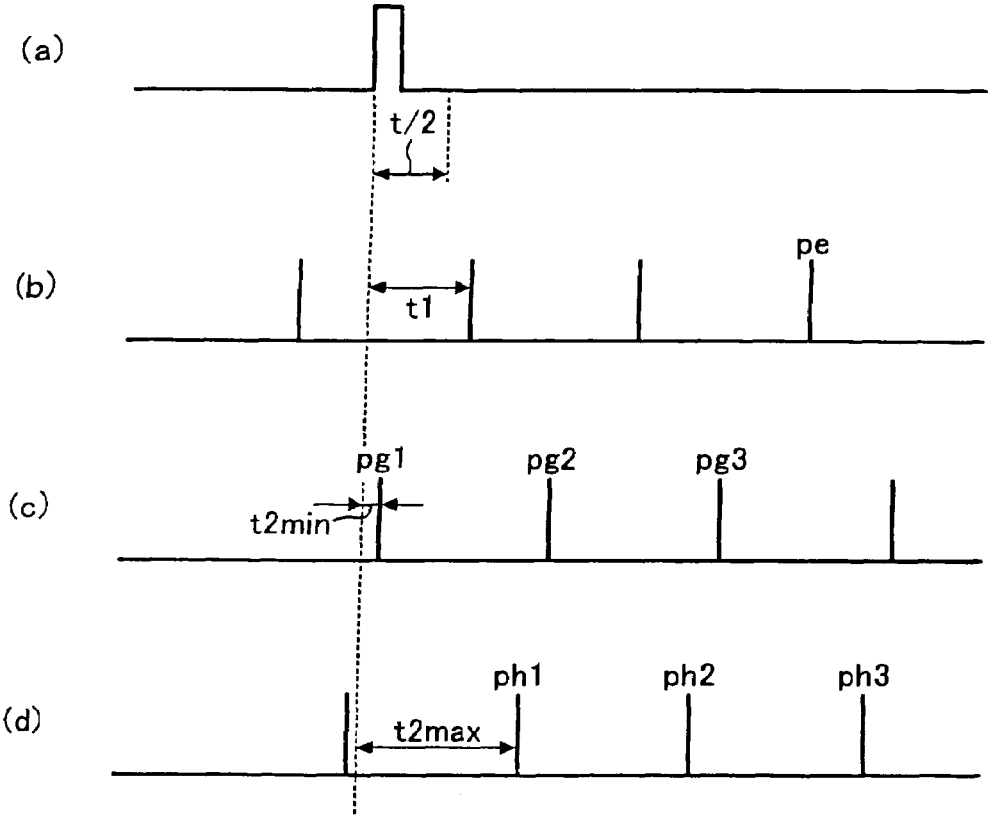
FIG. 9 is a timing chart for describing the operation of the beam selection control means shown in FIG. 8.

The counting means 18 is provided which counts the number of synchronizing signals of the writing means after the first reference value (period) elapses after the detection of the mark used as a writing starting reference during the formation of an image in the first color, and counts the number of synchronizing signals after the detection of the mark during the formation of images in second and later colors. The counting means is set at n, and the counting means instructs the writing controller to start image formation when the counted value reaches n. For example, when n=3, the formation of an image in the first color is started from pe when a synchronizing signal for the first color is the timing shown by (b) in FIG. 9. Moreover, in regard to the formation of images after second and later colors, calculation is performed with making pg3 a reference synchronizing signal when it is the timing of (c), or making ph3 a reference synchronizing signal when it is the timing of (d). Furthermore, image formation is started from the result of the calculation on the basis of FIG. 7.

Thus, the writing start position can be changed thereby avoiding the image formation on a connecting portion of an intermediate transfer member and use in the same portion.

Figure 10:
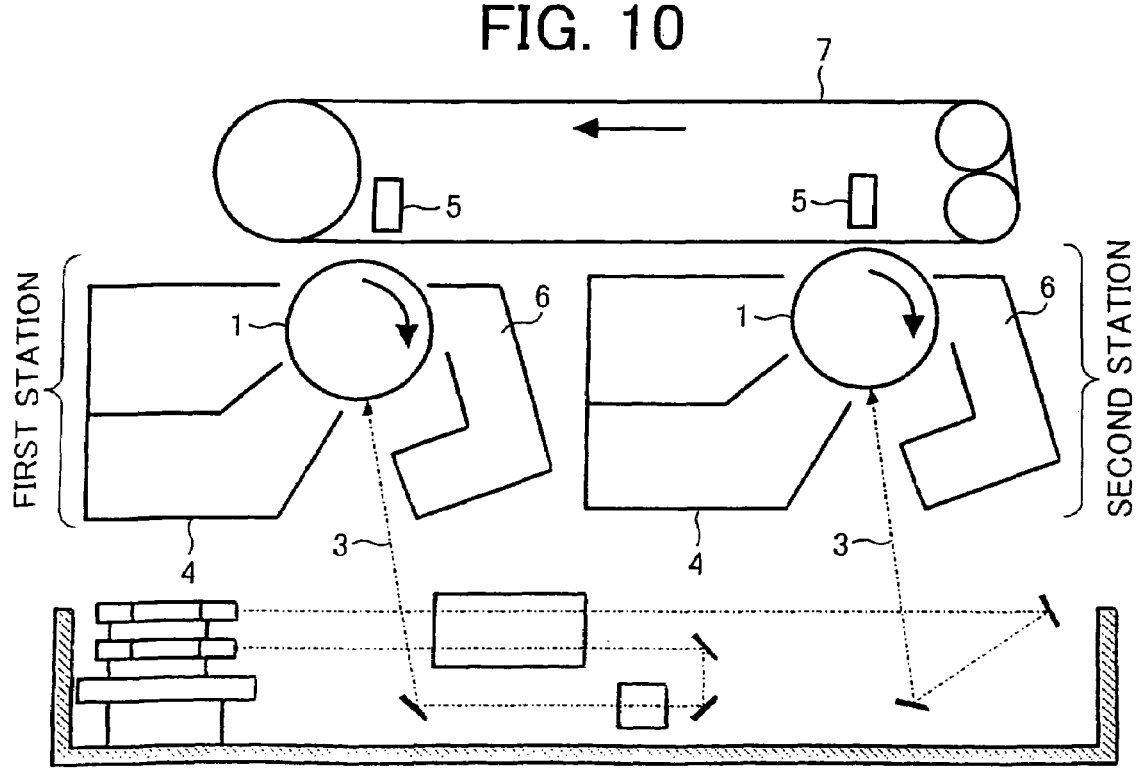
FIG. 10 is a diagram showing the construction of an image forming apparatus having two stations.

FIG. 10 shows the construction of the image forming apparatus with two stations according to the present invention. This image forming apparatus has two image forming means (first station for (C, M) and second station for (Y, K)) under the intermediate transfer member 7. Each image forming means comprises: one image carrier 1; writing beams 3; developing means 4 comprising at least two developing units each for developing an electrostatic latent image formed on this image carrier by each beam 3; and switching means which alternatively selects and drives a developing unit of the developing means 4. This image forming apparatus generates a multiple-color image by superimposing images formed by a plurality of above-mentioned image forming means, on an intermediate transfer member. Therefore, according to the present invention, it becomes possible to easily superimpose toner images formed on the intermediate transfer member in respective colors in adequate accuracy, and hence, it is possible to achieve a high-definition full color image forming apparatus that is free of image unevenness.

As described above, the present invention has the following advantageous features:

(1) Different beams that form superimposed lines can also provide a superimposed image with reduced image unevenness.

(2) It is possible to prevent adverse effects caused by needless tonality correction processing.

(3) A simple construction can achieve the controlled reduction of position (color) shift of a superimposed image, and suppress image unevenness.

(4) Even when the writing means with a two-line simultaneous scan is used, it is possible to decrease a position (color) shift of a superimposed image easily. In addition, it is possible to reduce the variation in position shifts of superimposed images.

(5) It is possible to reduce the image unevenness of a superimposed image easily.

(6) It is possible to reduce a position (color) shift of a superimposed image easily, and to suppress image unevenness.

(7) Since change an image formation position on an intermediate transfer member can be changed, it is possible to prevent the degradation of the intermediate transfer member.

(8) Since the image formation position on the intermediate transfer member can be changed depending on the operating conditions, it is possible to prevent the degradation of the intermediate transfer member.

(9) Also in an image forming apparatus which is small, high-speed, and low cost, it is possible to form a high-definition image without image unevenness where a position shift (color shift) of superimposed images is reduced.

Various modifications will become possible for those skilled in the art after receiving the teachings of the present disclosure without departing from the scope thereof.

What is claimed is:

1. An image forming method for generating a toner image from a latent image formed on an image carrier by a scan type writer and developer, the method comprising:
   concurrently performing scans to form a latent image with a plurality of beams, the beams being adjacent in a subscanning direction;
   selecting from the plurality of beams a beam which forms a headline at a time of formation of an image in each color to perform tonality correction on each beam to change beam emission characteristics of each beam to beam emission characteristics of the selected beam;
   developing the latent image to form a toner image;
   transferring the toner image onto an intermediate transfer member once for each respective color; and
   forming a color image by superimposing the toner images one at a time for each respective color.

2. The image forming method as claimed in claim 1, wherein the tonality level correction is not performed when a beam which forms a headline of a selected image is the same as a beam for an image formed previously.

3. The image forming method as claimed in claim 1, further comprising:
   detecting a mark used as a starting reference of an image in each color which is provided on an intermediate transfer member;
   measuring a first time as an elapsed time after each mark detection, said measuring restarting each time the mark is detected;
   calculating a difference between a first reference value, set beforehand, and the first time;
   measuring and storing a second time from detecting the mark to a synchronizing signal when or after the first time reaches the first reference value;
   calculating a third time as an absolute value of a difference between a time from detecting the mark used as the starting reference to a synchronizing signal generated by a writing mechanism in a second or later color and the second time;
   calculating a difference between the third time and a second reference value set beforehand;
   calculating a difference between the third time and a third reference value set beforehand;
   calculating a difference between the third time and a fourth reference value set beforehand;
   synchronizing the start of writing of an image in a first color with a synchronizing signal of the writing mechanism when the first time is larger than the first reference value;
   selecting a leading beam of an image in a second or later color according to the difference between the third time and the second reference value, the difference between the third time and the third reference value, the difference between the third time and the fourth reference value, and the difference between the time from detecting the mark used as the starting reference in a second or later color to a synchronizing signal generated by the writing mechanism and the second time.

4. The image forming method as claimed in claim 3, further comprising:
   using two beams as the plurality of beams for a scan;
   generating a writing synchronizing signal with a scanning beam with a period of T, wherein the first reference value is T/2, the second reference value is 5T/4, the third reference value is 3T/4, and the fourth reference value is T/4.

5. The image forming method as claimed in claim 3, further comprising:
when starting formation of an image in a second or later color, controlling start data so as to output empty data to a leading beam A and output headline data of an image to a subsequent beam B with delaying a page headline by one scan when the third time is greater than the second reference value, to output line data with delaying a page headline by one scan when the third time is greater than the third reference value and the third time is less than the second reference value, to output empty data to a leading beam A and output headline data of an image to a subsequent beam B when a difference between the time from detecting the mark used as the starting reference in a second or later color to the synchronizing signal generated by the writing mechanism and the second time is positive or to output image data in a second line to a leading beam A when the difference between the time from detecting the mark used as the starting reference in a second or later color to the synchronizing signal generated by the writing mechanism and the second time is negative, when the third time is greater than the fourth reference value and the third time is less than the third reference value, and to output image data in the same line as that in the first color when the third time is less than the fourth reference value.

6. The image forming method as claimed in claim 3, further comprising:
counting a number n as the number of synchronizing signals detected from a detection of the mark until a first reference value after detection of the mark;
starting writing an image in a first color when the count reaches n; and
controlling writing start timing in a second or later color so as to start writing of an image in synchronization with an n-th synchronizing detection signal of the writing mechanism after mark detection when the third time is less than the third reference value, or to start writing of an image in synchronization with an (n+1)-th synchronizing signal of the writing mechanism after mark detection when the third time is greater than the third reference value.

7. The image forming method as claimed in claim 6, further comprising:
setting n based on at least one of environmental temperature, print amount, and operating time.

8. The image forming method as claimed in claim 1, further comprising:
performing the tonality correction by changing a γ correction table of each beam.

9. The image forming method as claimed in claim 1, further comprising:
performing the tonality correction by changing the emission power of each beam.

10. The image forming method as claimed in claim 1, wherein the scan type writer and developer includes an intermediate transfer member and a plurality of image forming units facing a moving face of the intermediate transfer member, wherein each image forming unit comprises one image carrier, one writing mechanism, at least two developers which each develop an electrostatic latent image formed on the image carrier by a plurality of beams emitted from the writing mechanism, and a switch which alternatively selects and drives the developer, the method further comprising:

forming a color image by transferring a toner image formed by the image forming unit located at an upstream position to the intermediate transfer member; and
superimposing toner images formed by the image forming units located at downstream positions in order on the intermediate transfer member.

11. An image writing apparatus comprising:
a writing mechanism including a plurality of beams, the beams being adjacent in a subscanning direction and configured to perform concurrent scans, the writing mechanism configured to select from the plurality of beams a beam which forms a headline at a time of formation of an image in each color to perform tonality correction on each beam to change beam emission characteristics of each beam to beam emission characteristics of the selected beam.

12. The image writing apparatus as claimed in claim 11, wherein the writing mechanism does not perform a tonality level correction when a beam which forms a headline of a selected image is the same as a beam for an image formed previously.

13. The image writing apparatus as claimed in claim 11, further comprising:
an intermediate transfer member configured to receive multiple transfers of a toner image for respective colors, such that a color image is formed by superimposing the toner images by turns for respective colors;
mark detection means detecting a mark used as a starting reference of an image in each color which is provided on the intermediate transfer member;
first measuring means measuring as a first time an elapsed time since mark detection, said first time reset at each mark detection;
first judging means calculating a difference between a first reference value, set beforehand, with the first time;
first memory means measuring and storing as a second time a time from detecting the mark to a synchronizing signal when or after the first time reaches the first reference value;
calculation means obtaining a third time as an absolute value of a difference between a time from detecting the mark of the image starting reference to a synchronizing signal generated by the writing mechanism in a second or later color and the second time;
second judging means calculating a difference between a second reference value set beforehand and the third time;
third judging means calculating a difference between a third reference value set beforehand and the third time; and
fourth judging means calculating a difference between a fourth reference value set beforehand and the third time,
wherein writing of an image in a first color is started with synchronizing with a synchronizing signal of the writing mechanism when the first judging means judges that the first time is greater than the first reference value, and wherein a leading beam of an image in a second or later color is selected according to a result of the second judging means, a result of the third judging means, and a result of the fourth judging means, and a result of a positive or negative result of a difference obtained by the calculation means.

14. The image writing apparatus as claimed in claim 13, wherein a number of a plurality of beams for a scan is two, a period of a writing synchronizing signal which a scanning beam generates is T, the first reference value is T/2, the second reference value is 5T/4, the third reference value is 3T/4, and the fourth reference value is T/4.

15. The image writing apparatus as claimed in claim 13, wherein in regard to start of formation of an image in a second or later color, start data is controlled so as to output empty data to a leading beam A and output headline data of an image to a subsequent beam B with delaying a page headline by one scan when the third time is greater than the second reference value, to output line data with delaying a page headline by one scan when the third time is greater than the third reference value and the third time is less than the second reference value, to output empty data to a leading beam A and output headline data of an image to a subsequent beam B when a difference between the time from detecting the mark used as the starting reference in a second or later color to the synchronizing signal generated by the writing mechanism and the second time is positive or to output image data in a second line to a leading beam A when the difference between the time from detecting the mark used as the starting reference in a second or later color to the synchronizing signal generated by the writing mechanism and the second time is negative, when the third time is greater than the fourth reference value and the third time is less than the third reference value, and to output image data in the same line as that in the first color when the third time is less than the fourth reference value.

16. The image writing apparatus as claimed in claim 13, further comprising:
counting means for counting the number of synchronizing signals after the first time reaches a first reference value at the time of writing of an image in a first color,
wherein the number of synchronizing signals after mark detection at the time of writing in a second or later color is counted, writing of an image in a first color is started when a count of the counting means reaches n (n is a positive integer), and writing start timing in a second or later color is controlled so as to start writing of an image with synchronizing with an n-th synchronizing detection signal of the writing mechanism after mark detection when the third time is less than the third reference value, or to start writing of an image with synchronizing with an (n+1)-th synchronizing signal of the writing mechanism after mark detection when the third time is greater than the third reference value.

17. The image writing apparatus as claimed in claim 16, wherein n is based on at least one of environmental temperature, print amount, and operating time.

18. The image writing apparatus as claimed in claim 11, wherein the tonality correction is performed by changing a γ correction table of each beam.

19. The image writing apparatus as claimed in claim 11, wherein the tonality correction is performed by changing the emission power of each beam.

20. The image writing apparatus as claimed in claim 11, further comprising:
an intermediate transfer member; and
a plurality of image writing units which are arranged facing a moving face of the intermediate transfer member, each image writing unit including,
one image earner,
one writing mechanism,
at least two developers which each develop an electrostatic latent image formed in the image carrier by a plurality of beams emitted from the writing mechanism, and
a switch which alternatively selects and drives the developing means,
wherein the image writing apparatus forms a color image by transferring a toner image formed by an image writing unit located in an upstream position to the intermediate transfer member, and toner images formed by image writing units located in downstream positions are superimposed in order on the intermediate transfer member.

21. An image writing method for forming a latent image on an image carrier by a scan type writer, the method comprising:
concurrently performing scans to form a latent image with a plurality of beams, the beams being adjacent in a subscanning direction; and
selecting from the plurality of beams a beam which forms a headline at a time of formation of an image in each color to perform tonality correction on each beam to change beam emission characteristics of each beam to beam emission characteristics of the selected beam.

22. The image writing method as claimed in claim 21, wherein the tonality level correction is not performed when a beam which forms a headline of a selected image is the same as a beam for an image formed previously.

23. The image writing method as claimed in claim 21, further comprising:
developing the latent image to form a toner image;
transferring the toner image onto an intermediate transfer member once for each respective color;
detecting a mark used as a starting reference of an image in each color which is provided on the intermediate transfer member;
measuring a first time as an elapsed time after each mark detection, said measuring restarting each time the mark is detected;
calculating a difference between a first reference value, set beforehand, and the first time;
measuring and storing a second time from detecting the mark to a synchronizing signal when or after the first time reaches the first reference value;
calculating a third time as an absolute value of a difference between a time from detecting the mark used as the starting reference to a synchronizing signal generated by a writing mechanism in a second or later color and the second time;
calculating a difference between the third time and a second reference value set beforehand;
calculating a difference between the third time and a third reference value set beforehand;
calculating a difference between the third time and a fourth reference value set beforehand;
synchronizing the start of writing of an image in a first color with a synchronizing signal of the writing mechanism when the first time is larger than the first reference value;
selecting a leading beam of an image in a second or later color according to the difference between the third time and the second reference value, the difference between the third time and the third reference value, the difference between the third time and the fourth reference value, and the difference between the time from detecting the mark used as the starting reference in a second or later color to the synchronizing signal generated by the writing mechanism and the second time; and
forming a color image by superimposing the toner images one at a time for each respective color.

24. The image writing method as claimed in claim 23, further comprising:
using two beams as the plurality of beams for a scan;

generating a writing synchronizing signal with a scanning beam with a period of T,
wherein the first reference value is T/2, the second reference value is 5T/4, the third reference value is 3T/4, and the fourth reference value is T/4.

25. The image writing method as claimed in claim 23, further comprising:
when starting formation of an image in a second or later color, controlling start data so as to output empty data to a leading beam A and output headline data of an image to a subsequent beam B with delaying a page headline by one scan when the third time is greater than the second reference value, to output line data with delaying a page headline by one scan when the third time is greater than the third reference value and the third time is less than the second reference value, to output empty data to a leading beam A and output headline data of an image to a subsequent beam B when a difference between the time from detecting the mark used as the starting reference in a second or later color to the synchronizing signal generated by the writing mechanism and the second time is positive or to output image data in a second line to a leading beam A when the difference between the time from detecting the mark used as the starting reference in a second or later color to the synchronizing signal generated by the writing mechanism and the second time is negative, when the third time is greater than the fourth reference value and the third time is less than the third reference value, and to output image data in the same line as that in the first color when the third time is less than the fourth reference value.

26. The image writing method as claimed in claim 23, further comprising:
counting a number n as the number of synchronizing signals detected from a detection of the mark until a first reference value after detection of the mark;
starting writing an image in a first color when the count reaches n; and
controlling writing start timing in a second or later color so as to start writing of an image in synchronization with an n-th synchronizing detection signal of the writing mechanism after mark detection when the third time is less than the third reference value, or to start writing of an image in synchronization with an (n+1)-th synchronizing signal of the writing mechanism after mark detection when the third time is greater than the third reference value.

27. The image writing method as claimed in claim 26, further comprising:
setting n based on at least one of environmental temperature, print amount, and operating time.

28. The image writing method as claimed in claim 21, further comprising:
performing the tonality correction by changing a $\gamma$ correction table of each beam.

29. The image writing method as claimed in claim 21, further comprising:
performing the tonality correction by changing the emission power of each beam.

30. The image writing method as claimed in claim 21, wherein the scan type writer includes an intermediate transfer member and a plurality of image writing units facing a moving face of the intermediate transfer member, wherein each image writing unit comprises one image carrier, one writing mechanism, at least two developers which each develop an electrostatic latent image formed on the image carrier by a plurality of beams emitted from the writing mechanism, and a switch which alternatively selects and drives the developer, the method further comprising:
forming a color image by transferring a toner image formed by the image writing unit located at an upstream position to the intermediate transfer member; and
superimposing toner images formed by the image writing units located at downstream positions in order on the intermediate transfer member.

* * * * *